US012596844B2

(12) United States Patent
McCarley et al.

(10) Patent No.: US 12,596,844 B2
(45) Date of Patent: Apr. 7, 2026

(54) SYSTEMS AND METHODS FOR SECURE AGGREGATING AND REPORTING OF MONITORED DATA

(71) Applicant: Verizon Patent and Licensing Inc., Basking Ridge, NJ (US)

(72) Inventors: William McCarley, Grapevine, TX (US); Prem Doshi, Maywood, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 786 days.

(21) Appl. No.: 17/664,902

(22) Filed: May 25, 2022

(65) Prior Publication Data

US 2023/0409734 A1     Dec. 21, 2023

(51) Int. Cl.
| | |
|---|---|
| *G06F 21/62* | (2013.01) |
| *H04W 12/02* | (2009.01) |
| *H04W 12/03* | (2021.01) |

(52) U.S. Cl.
CPC .......... *G06F 21/629* (2013.01); *H04W 12/02* (2013.01); *H04W 12/03* (2021.01)

(58) Field of Classification Search
CPC ... H06F 21/629; H04L 9/0894; H04L 9/0618; H04L 9/3073; H04L 9/088; H04L 63/0428; H04L 67/04; H04L 67/131; H04L 69/04; H04L 69/22; H04L 67/1097; H04L 9/3236; H04L 9/0861; H04L 9/50; H04L 9/0819; H04L 9/14; G06F 21/6254; G06F 2212/402; G06F 8/61; G06F 21/10; G06F 21/602; G06F 2221/2109; G06F 16/27; G06F 16/9024; G06F 21/6218;

G06F 21/629; H04W 12/02; H04W 12/03; A63F 13/35; A63F 13/71; A63F 13/73; A63F 13/70; A63F 2300/552; A63F 2300/201

See application file for complete search history.

(56) References Cited

U.S. PATENT DOCUMENTS

| | | | | |
|---|---|---|---|---|
| 8,468,341 | B2 * | 6/2013 | Wat ........................ | G06Q 20/12 |
| | | | | 713/168 |
| 9,300,473 | B2 * | 3/2016 | Nix .......................... | H04L 9/088 |
| 10,819,686 | B2 * | 10/2020 | Baig ................... | H04L 63/0428 |
| 11,025,714 | B2 * | 6/2021 | Finlow-Bates ..... | H04W 12/106 |
| 11,184,169 | B1 * | 11/2021 | Sokolov ................ | H04L 9/0894 |
| 11,563,574 | B2 * | 1/2023 | Allen .................... | H04L 9/0861 |
| 11,575,582 | B2 * | 2/2023 | Bharti ................... | H04L 41/145 |

(Continued)

*Primary Examiner* — Catherine Thiaw

(57) ABSTRACT

A device described herein may maintain criteria associated with private information, and may receive action information that includes information regarding one or more actions performed by one or more systems. The device may identify a first subset of the action information that meets the criteria associated with private information, and may identify a second subset of the action information that does not meet the criteria associated with private information. The device may encrypt, using one or more keys, the first subset of the action information based on identifying that the first subset meets the criteria associated with private information, and may generate an action package based on the encrypted first subset and the second subset of the action information. Another device may use the one or more keys to decrypt the encrypted first subset of the action information included in the action package.

20 Claims, 9 Drawing Sheets

600

602 — Maintain criteria associated with public and/or private information

604 — Receive action information regarding one or more actions performed by one or more systems 606 — Identify subsets of received action information that meet/do not meet criteria associated with public and/or private information 608 — Encrypt subset of action information, associated with private information, with one or more keys 610 — Generate action package based on public information and encrypted private information 612 — Provide one or more keys to one or more entities that are authorized to access private information

(56) References Cited

U.S. PATENT DOCUMENTS

| | | | | |
|---|---|---|---|---|
| 11,665,533 | B1 * | 5/2023 | Balmakhtar | H04L 9/0894 |
| | | | | 380/270 |
| 11,722,313 | B2 * | 8/2023 | Misoczki | H04L 9/0618 |
| | | | | 713/177 |
| 11,924,330 | B1 * | 3/2024 | Bosworth | H04L 63/065 |
| 11,954,672 | B1 * | 4/2024 | Hamera | H04L 9/3247 |
| 12,003,635 | B2 * | 6/2024 | Kumarji | H04L 9/0894 |
| 12,010,226 | B2 * | 6/2024 | Manevich | G06F 21/602 |
| 2010/0246827 | A1 * | 9/2010 | Lauter | H04L 9/0836 |
| | | | | 380/278 |
| 2014/0040979 | A1 * | 2/2014 | Barton | H04W 12/30 |
| | | | | 726/1 |
| 2018/0343114 | A1 * | 11/2018 | Ben-Ari | H04L 9/302 |
| 2020/0059856 | A1 * | 2/2020 | Cui | H04L 41/40 |
| 2020/0322794 | A1 * | 10/2020 | Baltatu | H04L 9/3073 |
| 2020/0356679 | A1 * | 11/2020 | Cooke | G06F 8/61 |
| 2021/0049284 | A1 * | 2/2021 | Tyagi | G06F 21/629 |
| 2021/0075603 | A1 * | 3/2021 | Hennebert | H04L 9/0618 |
| 2021/0289351 | A1 * | 9/2021 | Ferdi | H04W 12/041 |
| 2022/0166799 | A1 * | 5/2022 | Johnson | H04W 12/71 |
| 2022/0191697 | A1 * | 6/2022 | Arngren | H04W 12/084 |
| 2022/0240087 | A1 * | 7/2022 | Balmakhtar | H04W 12/08 |
| 2022/0407778 | A1 * | 12/2022 | Buonocunto | H04L 41/5041 |
| 2022/0408262 | A1 * | 12/2022 | Saroiu | H04W 16/14 |
| 2023/0007474 | A1 * | 1/2023 | Ni | H04L 63/0272 |
| 2023/0199552 | A1 * | 6/2023 | Bahl | H04W 12/08 |
| | | | | 398/79 |
| 2023/0388787 | A1 * | 11/2023 | Wilson | H04L 9/0825 |
| 2023/0409734 | A1 * | 12/2023 | McCarley | G06F 21/629 |
| 2024/0146702 | A1 * | 5/2024 | Puente Pestaña et al. | |
| | | | | H04L 63/0442 |
| 2024/0154816 | A1 * | 5/2024 | Armleder | H04L 9/3247 |

* cited by examiner

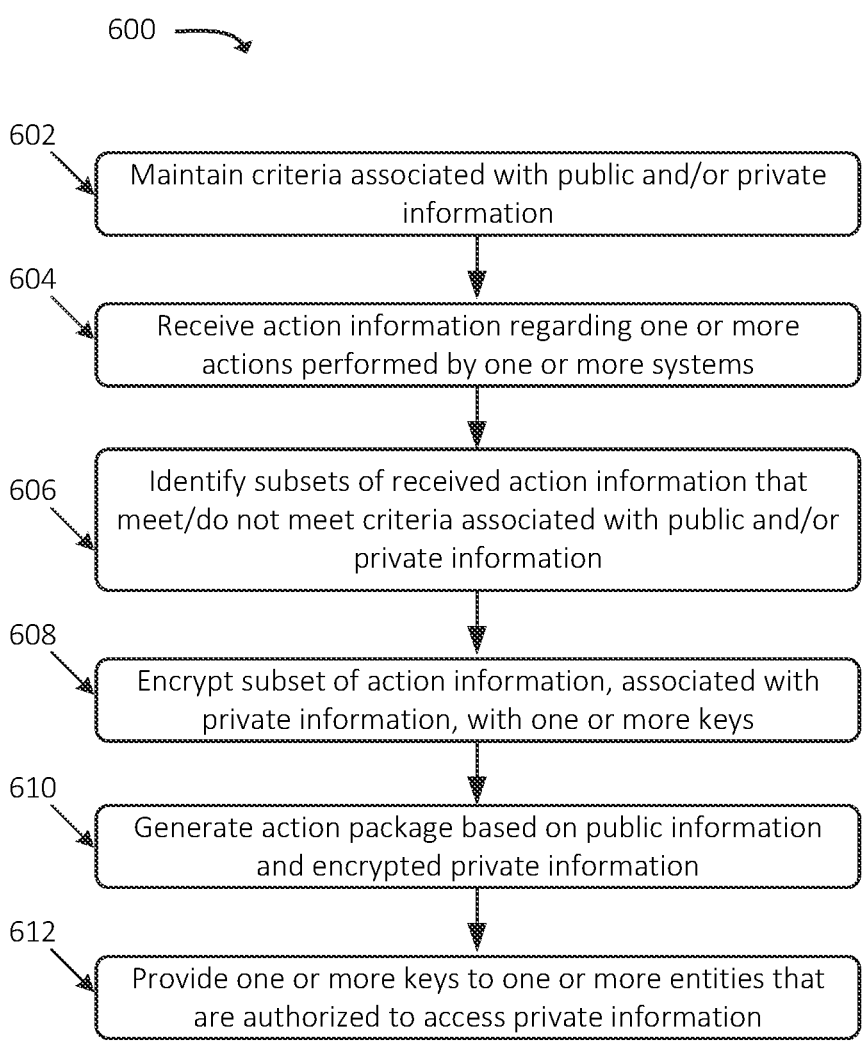

600

602
Maintain criteria associated with public and/or private information

604
Receive action information regarding one or more actions performed by one or more systems 606
Identify subsets of received action information that meet/do not meet criteria associated with public and/or private information 608
Encrypt subset of action information, associated with private information, with one or more keys 610
Generate action package based on public information and encrypted private information 612
Provide one or more keys to one or more entities that are authorized to access private information

Bus
910

SYSTEMS AND METHODS FOR SECURE AGGREGATING AND REPORTING OF MONITORED DATA

BACKGROUND

Networks, organizations, etc. may make use of multiple devices or systems that process information, such as network traffic, inter-device communications, etc. Different systems may perform different processing operations, and the input of one system may be the output of one or more other systems. Network providers, device manufacturers, system vendors, or other entities may monitor overall network performance or performance of individual components in order to perform analytics, diagnose potential issues, etc.

BRIEF DESCRIPTION OF THE DRAWINGS

FIG. 6 illustrates an example process for providing secure and/or tiered access to action information, in accordance with some embodiments;

DETAILED DESCRIPTION OF EXAMPLE EMBODIMENTS

The following detailed description refers to the accompanying drawings. The same reference numbers in different drawings may identify the same or similar elements.

Embodiments described herein provide for the secure monitoring and/or aggregation of one or more devices or systems, which may include providing detailed or sensitive information regarding actions taken by particular devices or systems to authorized entities, while restricting access to such detailed or sensitive information from entities that are not authorized to access such information. In this manner, a given entity may have the ability to monitor, or trace, the overall end-to-end operation of a system that includes one or more sub-systems (or other types of devices or systems), and may further have the ability to receive detailed information regarding the operation of particular sub-systems that are relevant to the entity (e.g., where the entity is a manufacturer or developer of sub-system, where the entity owns and/or operates the sub-system, etc.) and/or which the entity is otherwise authorized to access.

Figure 1:
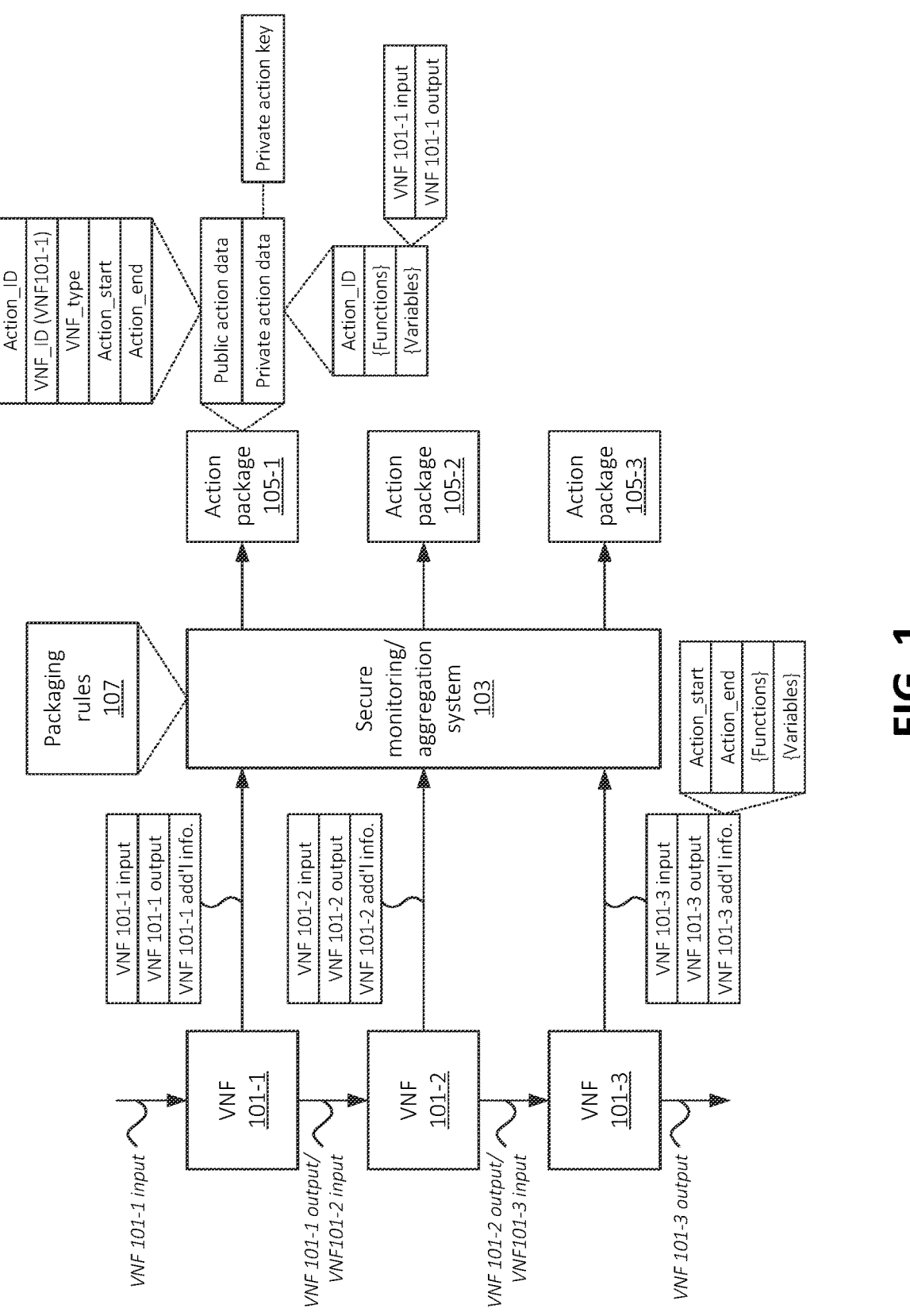
FIG. 1 illustrates an example overview of one or more embodiments described herein.

As shown in FIG. 1, for example, a set of Virtualized Network Functions ("VNFs") 101-1 through 101-3 may receive respective inputs, and may perform one or more actions or otherwise process the inputs in order to generate respective outputs. In this example, some or all of the output of VNF 101-1 may be used as input by VNF 101-2, and some or all of the output of VNF 101-2 may be used as input by VNF 101-3. In some embodiments, the inputs and outputs may be associated with one or more network operations, such as a voice call setup, a connection of a mobile telephone to a RAN, a protocol data unit ("PDU") session establishment between a User Equipment ("UE") and a core network, etc. VNFs 101 may include and/or may be implemented by devices, systems, NFs, etc. such as an Access and Mobility Management Function ("AMF"), a Mobility Management Entity ("MME"), a Session Management Function ("SMF"), a Serving Gateway ("SGW"), a User Plane Function ("UPF"), a Packet Data Network ("PDN") Gateway ("PGW"), and/or some other element of a wireless network. While concepts discussed herein are provided in the context of VNFs, in some embodiments, similar concepts may apply to other types of devices, systems, applications, or other types of data sources.

As further shown, VNFs 101 may be communicatively coupled to Secure Monitoring/Aggregation System ("SMAS") 103. For example, VNFs 101 may communicate with SMAS 103 via one or more application programming interfaces ("APIs") or other suitable communication pathways. VNFs 101 may, for example, provide information to SMAS 103 associated with one or more actions, operations, processes, etc. associated with (e.g., performed by) VNFs 101. For example, the generation of output data by VNF 101-1 based on input data may be a first action, the generation of output data by VNF 101-2 based on input data (e.g., based on the output data of VNF 101-1 and/or based on other data) may be a second action, and the generation of output data by VNF 101-3 based on input data (e.g., based on the output data of VNF 101-2 and/or based on other data) may be a third action.

VNFs 101-1 through 101-3 may each provide, to SMAS 103, information associated with the respective actions performed by VNFs 101-1 through 101-3. For example, VNF 101-1 may provide input data, output data generated via the first action (e.g., based on the input data), as well as additional information associated with the first action. Similarly, VNF 101-2 may provide input data, output data generated via the second action, as well as additional information associated with the second action, and VNF 101-3 may provide input data, output data generated via the third action, as well as additional information associated with the third action.

The "additional information" may include other information about each respective action, such as a time at which the action started (e.g., which may be or may be based on a time at which respective input was received, based on a time at which VNF 101 started performing processing, etc.), a time at which the action ended (e.g., which may be or may be based on a time at which respective output was provided by VNF 101, based on a time at which VNF 101 finished performing processing, etc.). The additional information may include, for example, an indication of a set of functions, operations, subroutines, API calls, etc. used by VNF 101 to generate the output. Additionally, or alternatively, the additional information may include one or more variables, values, etc. associated with the above-mentioned functions. In some embodiments, the additional information may include other information associated with the actions, such as labels, tags, metadata, etc. provided by respective VNFs 101. In some embodiments, each VNF 101 may independently specify the content of the "additional information" provided by each respective VNF 101.

As discussed herein, SMAS 103 may generate one or more action packages 105 based on the information received from VNFs 101-1 through 101-3. For example, SMAS 103 may generate action package 105-1 based on the information received from VNF 101-1, may generate action package 105-2 based on the information received from VNF 101-2, and may generate action package 105-3 based on the information received from VNF 101-3. Each action package 105 may include public action data and private action data. In some embodiments, the public action data may include data that is unencrypted, while the private action data may include data that is encrypted (and/or is associated with some other type of security mechanism). In some embodiments, the public action data and private action data may both be encrypted, but may be associated with different encryption keys or other suitable security mechanisms. Generally, the public action data may be accessible by a set of entities, while the private action data may be accessible by only a subset of the set of entities (e.g., where the subset of entities is authorized to access the private action data, while other entities of the set of entities are not), and/or by a different set of entities.

As shown in FIG. 1, the private action data may be associated with one or more private action keys, which may be used to encrypt and/or decrypt the private action data. In some embodiments, as noted above, the private action data may be secured by some other suitable mechanism.

In some embodiments, the generation, compartmentalization, etc. of action data received from a given VNF 101 may performed based on one or more packaging rules 107 maintained by SMAS 103. In some embodiments, packaging rules 107 may have been received from an operator and/or administrator of SMAS 103, may have been received from an operator and/or administrator of one or more VNFs 101, may be automatically generated and/or refined using artificial intelligence/machine learning ("AI/ML") techniques or other suitable automated techniques, etc.

Packaging rules 107 may indicate, for example, which portions of action data, that is received from a particular type of VNF 101, from a particular VNF 101, and/or that otherwise meets other suitable criteria, are designated as public action data and/or which portions of action data are designed as private action data. Packaging rules 107 may specify criteria such as VNF type (e.g., an AMF, an MME, etc.), network slice (e.g., where the action data from a given VNF 101 indicates a network slice with which the given VNF 101 is associated and/or where SMAS 103 is otherwise able to ascertain the network slice associated with the given VNF 101), geographical region, and/or other suitable criteria.

For example, packaging rules 107 may indicate a first subset of action data received from a first type of VNF 101 as public action data, may indicate a second subset of action data received from the first type of VNF 101 as private action data. Packaging rules 107 may further indicate a third subset of action data received from a second type of VNF 101 as public action data, and may indicate a fourth subset of action data received from the second type of VNF 101 as private action data.

As another example, packaging rules 107 may indicate a first subset of action data received from a VNFs 101 located within a first geographical region and/or implemented at a first datacenter as public action data, may indicate a second subset of action data received from VNFs 101 located within the first geographical region and/or implemented at the first datacenter as private action data. Packaging rules 107 may further indicate a third subset of action data received from VNFs 101 located within a second geographical region and/or implemented at a second datacenter as public action data, and may indicate a fourth subset of action data received from VNFs 101 located within the second geographical region and/or implemented at the second datacenter as private action data.

The public action data and private action data may therefore be derived from action data received from respective VNFs 101. In some embodiments, VNFs 101 may receive (e.g., from SMAS 103 or some other source) an indication of an API, format, schema, structure, etc. of public and/or private action data associated with VNFs 101 (e.g., as specified by packaging rules 107 that are applicable to such VNFs 101). VNFs 101 may accordingly utilize such information to structure the action data provided to SMAS 103. Additionally, or alternatively, VNFs 101 may not receive and/or use such data, and SMAS 103 may use suitable techniques to identify particular public and/or private action data based on action data received from VNFs 101.

In some embodiments, SMAS 103 may generate and/or receive an identifier for each action as indicated by VNFs 101. For example, SMAS 103 may generate the identifiers, and/or may derive or extract the identifiers based on received action information. In this manner, SMAS 103 may track public and private data associated with each action and/or VNF 101, thus facilitating the retrieval of such information, as discussed below. In the example of FIG. 1, public action data associated with action information received from VNF 101-1 may include the identifier associated with the action information (shown as "Action_ID"), an identifier of the particular VNF 101 that performed the action and/or from which the action information was received (shown as "VNF_ID"), a type of the particular VNF 101 (shown as "VNF_type"), and/or other information. In some embodiments, the public information may include a portion of the "additional information" of the action information, such as a start time (shown as "Action_start") and/or an end time (shown as "Action_end") associated with the action and/or other portions of the "additional information" of the action information.

As further shown, private action data associated with action information received from VNF 101-1 may include the identifier of the action (e.g., such that the public and private action data may both be identified by the same action identifier), one or more functions, sub-routines, API calls, etc. that were performed as part of the action (shown as "{Functions}"), and/or one or more variables that were used by such functions (shown as "{Variables}"). The variables may include, for example, the input and/or output associated with the action and/or one or more other variables that are used by, generated by, provided to, etc. the one or more functions performed as part of the action.

In some embodiments, the public and/or private action data may include additional and/or different types of information than the information shown in the examples above. Further, while examples of public and private action data associated with an action performed by VNF 101-1 are shown in FIG. 1, in practice, other types of action data may be indicated (e.g., by packaging rules 107) as public and/or private action data. Further, while examples of public and private action data associated with action package 105-1 are shown in FIG. 1, action packages 105-2 and 105-3 may also include respective public and/or private action data.

As noted above, the private data may be associated with one or more security mechanisms whereby the private data is not accessible to unauthorized entities, such as one or more encryption keys (shown as "private action key"). Such security mechanisms may include, for example, an encryption of the private action data, refraining from providing the private action data to entities that do not perform suitable authentication procedures, etc.

Figure 2:
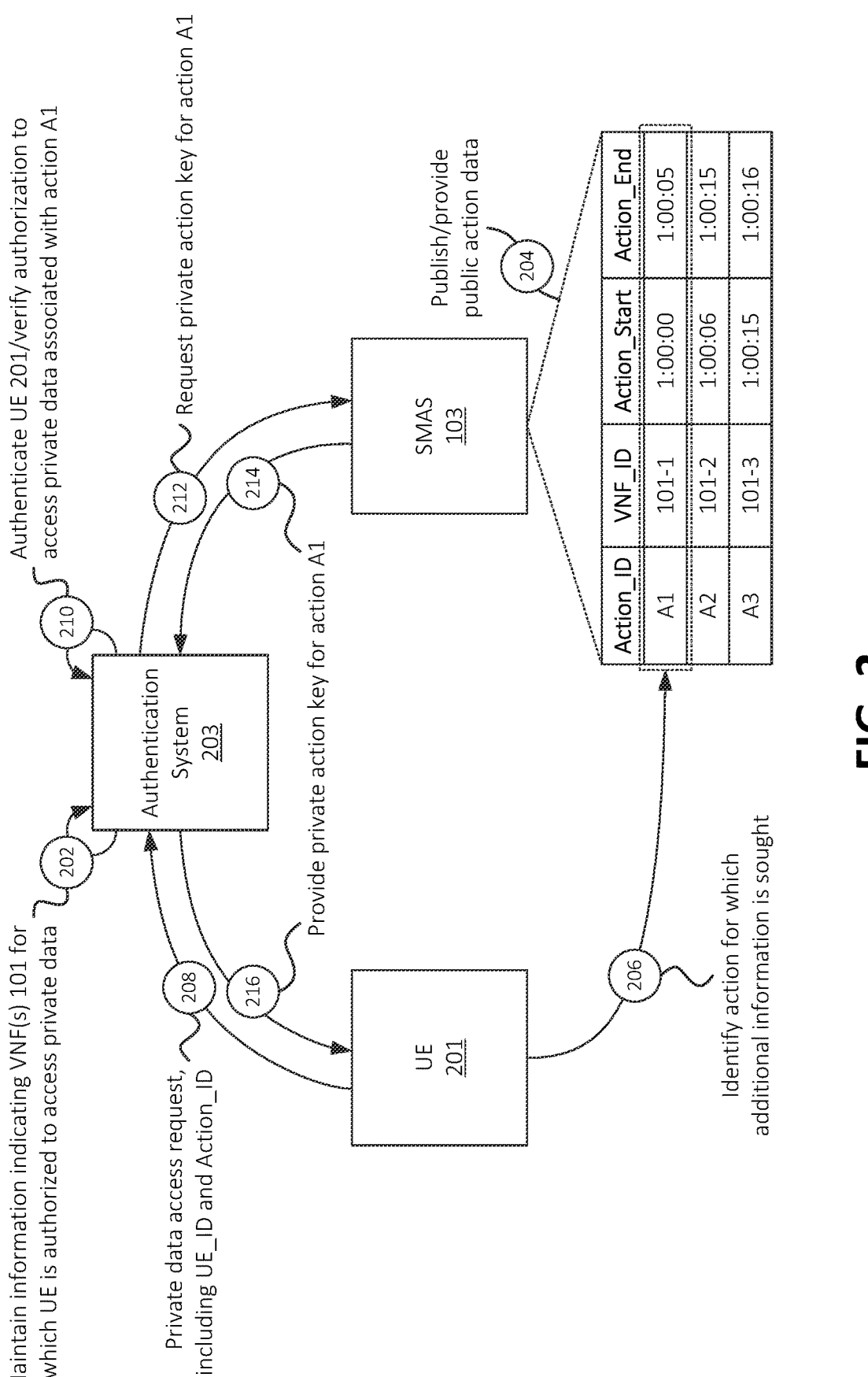
FIGS. 2 and 3 illustrate an example retrieval of action data, as maintained in one or more action packages, in accordance with some embodiments.
Figure 3:
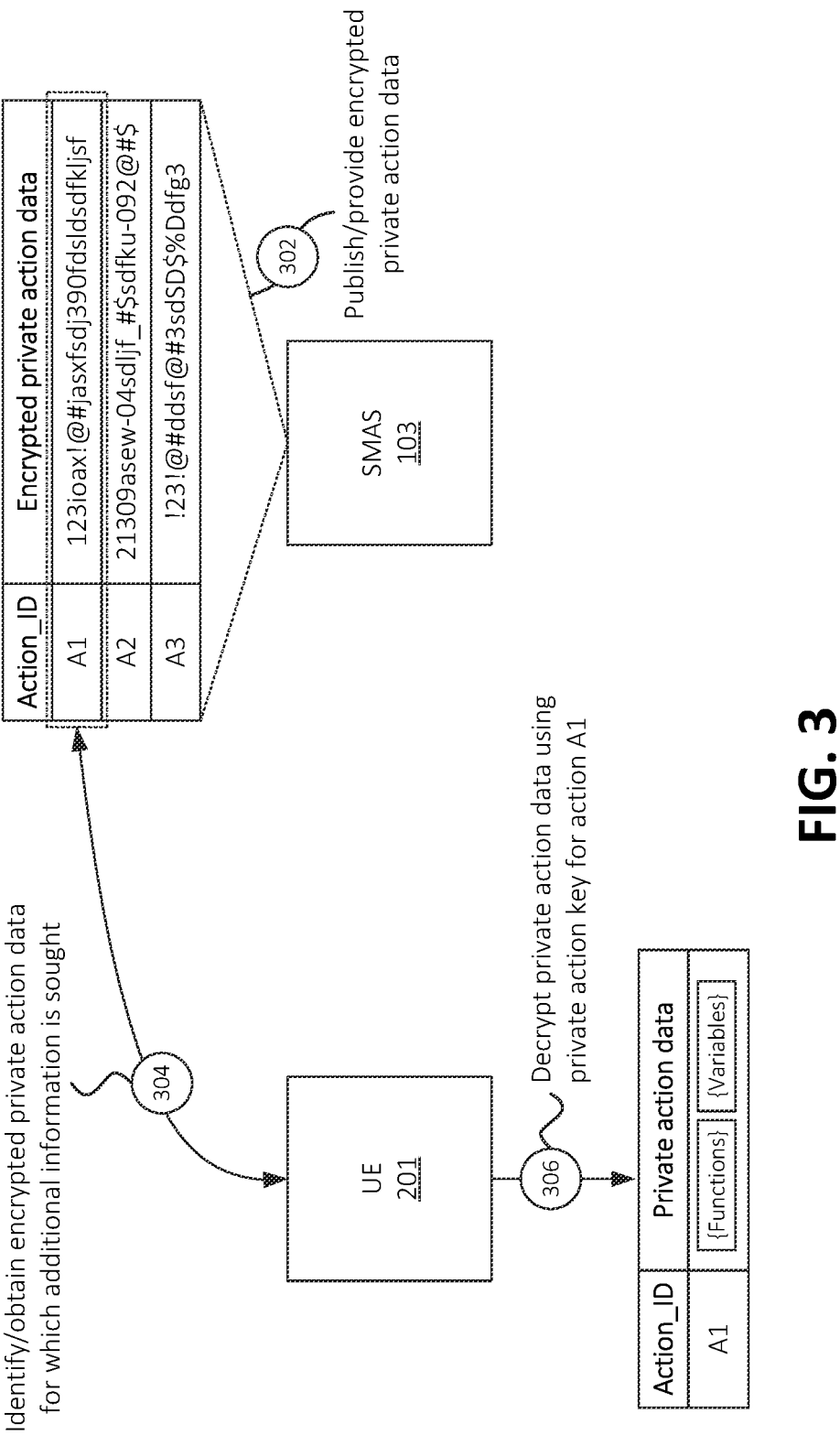

FIGS. 2 and 3 illustrate an example retrieval of action data (e.g., as maintained in one or more action packages 105). In some embodiments, the secure access to private action data may be provided in accordance with, and/or otherwise facilitated by, authentication system 203, which may maintain (at 202) information indicating particular VNFs 101 to which one or more entities (e.g., UEs 201, users, etc.) are authorized to access. Such information may include, for example, information associating a particular UE identifier, such as a Mobile Directory Number ("MDN"), Internet Protocol ("IP") address, International Mobile Station Equipment Identity ("IMEI"), etc., with one or more VNFs 101 (e.g., particular VNFs 101, particular types of VNFs 101, VNFs 101 located in a particular geographical region, VNFs 101 implemented at a particular datacenter, and/or other indicators of VNFs 101) for which the one or more entities are authorized to access. Additionally, or alternatively, information maintained by authentication system 203 may associate an identifier associated with a user of UE 101, such as a user name, a user account identifier, etc., with one or more VNFs 101 for which the user is authorized to access.

As shown in FIG. 2, SMAS 103 may publish and/or otherwise provide (at 204) the public action data associated with one or more action packages 105 (e.g., associated with one or more actions performed by one or more VNFs 101). For example, SMAS 103 may provide such information via a web portal, an API, a blockchain, or other suitable mechanism. In some embodiments, SMAS 103 may provide such information only to authorized entities (e.g., may use one or more authentication mechanisms to provide secure access to the public action data). In some embodiments, SMAS 103 may provide such information to any entity that requests or attempts to access such data.

In this example, a particular UE 201 may access the provided public action data, and may identify a particular action for which additional information (e.g., private action data) is sought. For example, a user of UE 201 may identify the particular action based on content of the public action data, and/or UE 201 (e.g., an application executing at UE 201) may automatically identify the particular action based on an identifier or type of VNF 101 and/or other suitable criteria.

Based on identifying the particular action for which additional information is sought, UE 201 may output (at 208) a request for access to the private action data. The request may include, for example, an identifier of the particular action and/or an identifier associated with UE 201. The identifier associated with UE 201 may include a device identifier such as an MDN, IP address, IMEI value, etc. Additionally, or alternatively, the identifier associated with UE 201 may include an identifier associated with a user of UE 101, such as a user name, a user account identifier, etc.

In some embodiments, UE 201 may output (at 208) the request to authentication system 203. Although the example of FIG. 2 shows communications between UE 201 and authentication system 203, in some embodiments, UE 201 may output the request to SMAS 103, which may forward some or all of the request to authentication system 203. Similarly, SMAS 103 may forward communications from authentication system 203 to UE 201.

Based on the request associated with UE 201, authentication system 203 may authenticate UE 201 and/or may verify authorization of UE 201 to access private action data associated with the requested action identifier. For example, authentication system 203 may access the public action data to identify one or more attributes of the public action data based on which authorization of UE 201 to access the corresponding private action data may be verified, such as an identifier of a particular VNF 101 with which the action is associated, a particular VNF type with which the action is associated, and/or other suitable criteria. For example, authentication system 203 may compare the information associated with UE 201 and/or the user of UE 201, as well as some or all of the public data associated with the indicated action, to the previously received or maintained (at 202) information indicating VNFs 101 (and/or other criteria) for which UE 201 is authorized to access private action data. Authentication system 203 may further perform one or more authentication techniques with respect to UE 201, such as requesting a user name and/or password, initiating a biometric authentication procedure at UE 201, etc., in order to authenticate UE 201 and/or the user of UE 201.

In the event that UE 201 is not authenticated and/or is not authorized to access the requested private action information, authentication system 203 may reject the request made (at 208) by UE 201. On the other hand, assuming that authentication system 203 has determined that UE 201 is authorized to access the requested private action data, authentication system 203 may request a private action key and/or other suitable information based on which the requested private action data may be accessed. SMAS 103 may accordingly provide (at 214) the requested private action key to authentication system 203, which may forward (at 216) the private action key to UE 201. Additionally, or alternatively, authentication system 203 may provide an identifier of UE 201, such that SMAS 103 may forward the private action key to UE 201 directly, may provide the key to a key escrow server along with the identifier of UE 201 (e.g., such that UE 201 may retrieve the key from the key escrow server), and/or may otherwise provide the key to UE 201. In some embodiments, SMAS 103 may provide the private action key to UE 201 in some other suitable manner. In some embodiments, the private action key may be a particular key of an asymmetric key pair, where a first key of the key pair is used to encrypt the private action data, while a second key of the key pair (e.g., as provided to UE 201 at 214 and 216) may be used to decrypt the private action data. For the sake of simplicity, the key, keys, and/or other authentication mechanisms that may be used to encrypt, obscure, secure, decrypt, access, etc. the private action data is referred to in the figures as a "private action key."

UE 201 may use the private action key to access private action data associated with the identified (at 206) action information. For example, as shown in FIG. 3, SMAS 103 may publish, provide, etc. (at 302) private action data, which may be encrypted or otherwise secured. In this manner, the encrypted private action data may be accessible to entities that do not necessarily have the private action key, but the contents of the private action data may not be accessible to entities that do not have the private action key. Additionally, or alternatively, SMAS 103 may only make private action data available to certain entities, such as entities that participate in an authentication and/or authorization procedure with respect to such private action data. In some embodiments, the private action data may include and/or may be associated with unencrypted or otherwise accessible information, such as an action identifier based on which a respective action, with which the private action data is associated, may be identified.

In this example, assume that UE 201 is able to access some or all of the private action data (e.g., the encrypted private action data) associated with actions A1-A3. UE 201 may identify (at 304) that private action data is available for one or more actions for which additional information is sought. For example, UE 201 may identify an action identifier of example action A1, which may be the same action identifier of public information identified (at 206) by UE 201 and for which a private action key was received (at 216).

UE 201 may obtain (at 304) the private action data from SMAS 103. For example, as discussed above, SMAS 103 may make the private action data (e.g., the encrypted private action data) available for access by any entity and/or by certain authorized entities, which may include UE 201. UE 201 may accordingly decrypt (at 306) the obtained private action data, in order to access the contents of the private action data (e.g., the contents of the decrypted private action data).

In some embodiments, private action data may itself include one or more action packages 105, which may be associated with public action data and private action data. For example, an action package may have multiple privacy tiers, where each tier is associated with a respective private action key or other suitable security mechanism. In this manner, an entity that is authorized to access private action data associated with one privacy tier associated with a given action package 105 may not necessarily be authorized to access private action data associated with another privacy tier associated with the same action package 105.

Figure 4:
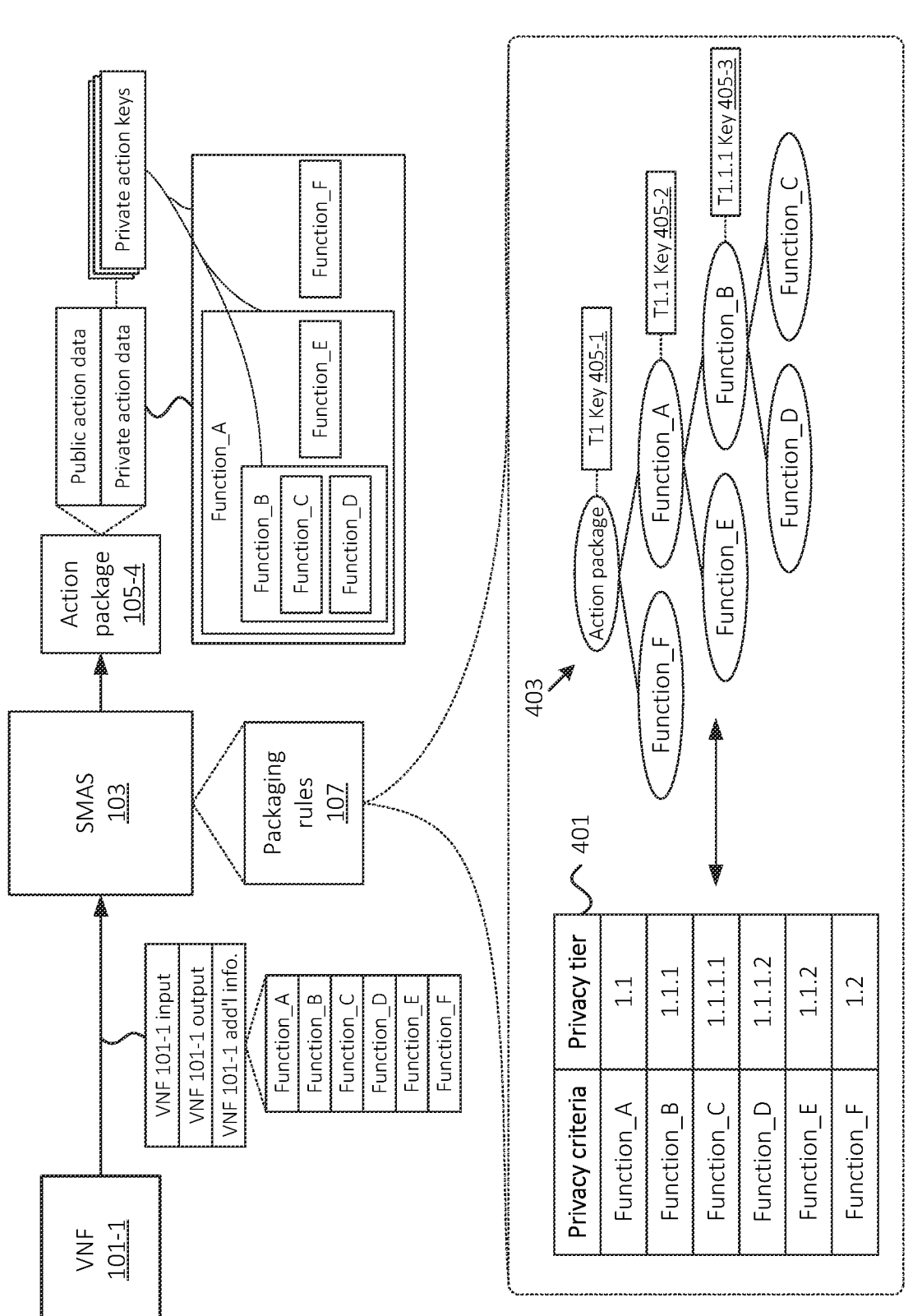
FIGS. 4 and 5 illustrate an example of action packages with multiple privacy tiers, in accordance with some embodiments.

As shown in FIG. 4, for example, packaging rules 107 may include privacy criteria, based on which certain portions of action information associated with a particular action may be associated with different privacy tiers. In this example, the privacy criteria (e.g., as shown in example data structure 401) specifies particular functions (e.g., function, sub-routines, API calls, etc. performed by a given VNF 101) that are associated with different privacy tiers. In some embodiments, the privacy criteria may include additional and/or different criteria, which may include (e.g., as discussed above) location-based criteria, identifiers of particular VNFs 101, types of VNFs 101, etc.

As represented by tree 403, packaging rules 107 may specify that information associated with Function_A and Function_F are associated with a first privacy tier (e.g., Tier 1, which may be a top-level tier associated with an action package generated based on packaging rules 107). Information associated with Function_A is denoted as "Tier 1.1" in the figure and information associated with Function_F is denoted as "Tier 1.2," to denote that these information items are different information items associated with the same tier, and which may therefore be accessed using the same private action key (e.g., key 405-1).

PACKAGING RULES 107 may further specify that that Function_B and Function_E are associated with sub-tiers of a particular information item of Tier 1, namely Function_A (e.g., sub-tiers of Tier 1.1). As similarly noted above, information associated with Function_B is denoted as "Tier 1.1.1" in the figure and information associated with Function_E is denoted as "Tier 1.1.2," to denote that these information items are different information items associated with the same tier, and which may therefore be accessed using the same private action key (e.g., key 405-2). Similarly, private action key 405-3 may be used to access private action data associated with Function_C and Function_D.

In some embodiments, each particular tier or sub-tier may be associated with its own respective private action key. For example, private action data associated with Function_A may be associated with a first private action key 405, while private action data associated with Function_F may be associated with a second private action key 405. In some embodiments, access to different nested private action data (e.g., nested action packages 105) may be secured and/or provided in some other suitable manner.

In some embodiments, access to sub-tiers may be only provided to entities that have access (e.g., a private action key) to a parent tier, and different sub-tiers of the same parent tier may be associated with different private action keys. For example, in some embodiments, access to Tiers 1.1.1 and 1.1.2 (e.g., Function_B and Function_E) may only be available to entities that have access to parent tier 1.1 (e.g., Function_A). For example, access to private action information associated with Function_B may require the use of keys 405-1, 405-2, and 405-3.

When receiving action information from VNF 101-1, SMAS 103 may, based on packaging rules 107, generate action package 105-4, in which private action data is nested and/or otherwise arranged according to the privacy tiers specified by packaging rules 107. For example, action package 105-4 may itself include multiple nested action packages with their own respective public and private action data.

Figure 5:
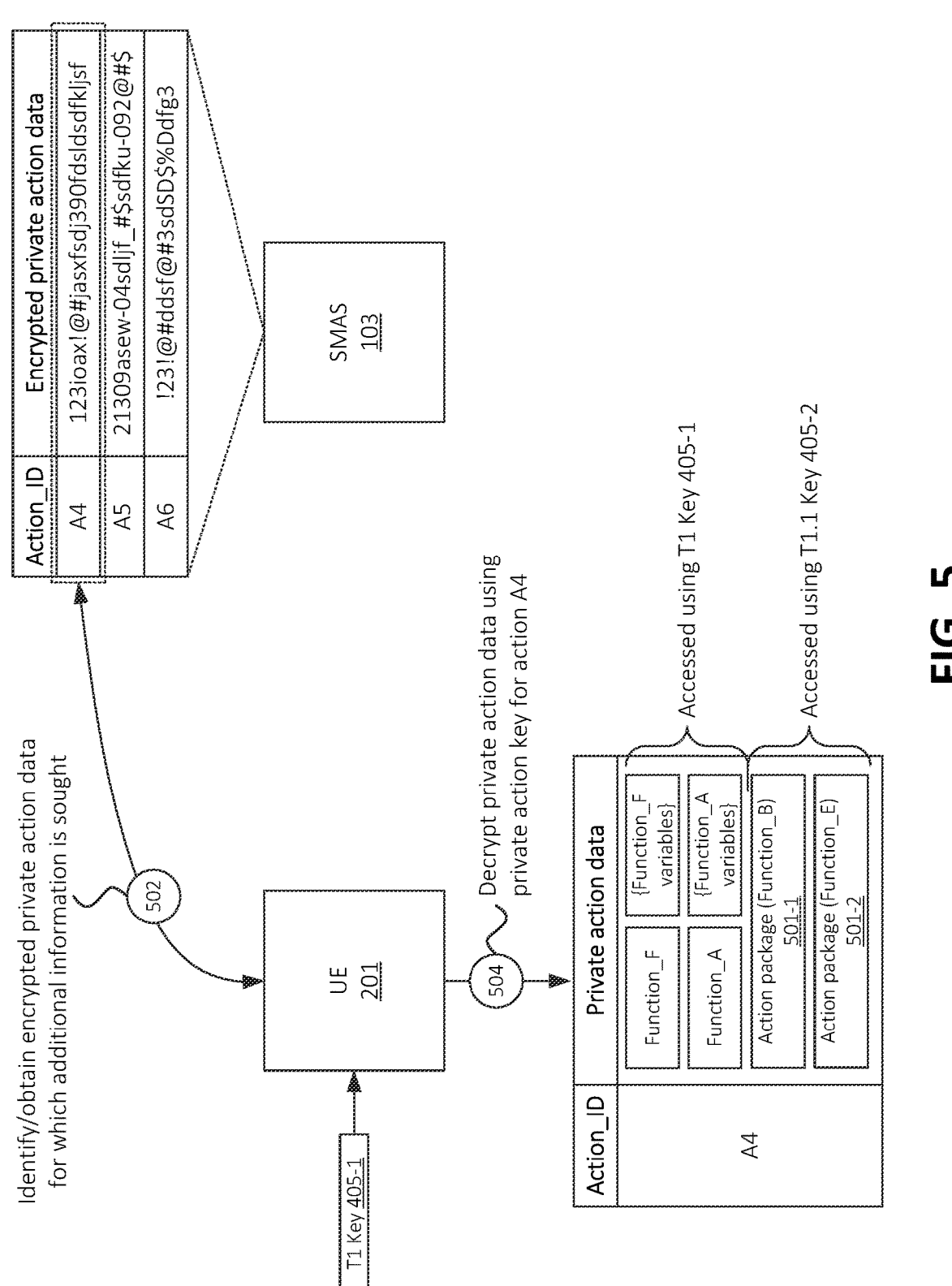

As shown in FIG. 5, assume that UE 201 has obtained Tier 1 private action key 405-1. As similarly discussed above, UE 201 may also identify and/or obtain (at 502) encrypted private action data associated with a particular action A4. For example, as similarly discussed above, the private action data associated with action A4 may be a private, encrypted, etc. portion of a particular action package associated with action A4, which includes private action data and public action data.

UE 201 may use private action key 405-1 to decrypt the received (at 502) private action data for action A4, based on which top-level privacy tier information may be accessed. In this example, such information may include information regarding Function_A and associated variables, as well as information regarding Function_F and associated variables. The private action data decrypted using private action key 405-1 may also include action packages 501-1 and 501-2, which are associated with sub-tiers of private action key 405-1. For example, the private action data associated with action A4, decrypted using private action key 405-1, may include action package 501-1, associated with Function_B, and may also include action package 501-2, associated with Function_E. For example, action packages 501-1 and 501-2 may include public action data associated with action packages 501-1 and 501-2, and/or may include action identifiers based on which UE 201 may obtain associated public action data from SMAS 103.

UE 201 may perform similar processes as discussed above with respect to FIGS. 2 and 3 to obtain associated a private action key associated with action packages 501-1 and/or 501-2, in order to access (e.g., decrypt) private action data associated with action packages 501-1 and/or 501-2. For example, assuming UE 201 is authorized to access such information, UE 201 may obtain and use private action key 405-2 to access the contents of action packages 501-1 and 501-2 (e.g., which may include detailed action information associated with Function_B and Function_E). Further, although not explicitly shown in FIG. 5, action package 501-1 may further include respective action packages associated with Function_D and Function_C, which may be accessed using private action key 405-3. In this manner, action packages may be arranged in a hierarchical manner, such that access to some detailed information may be provided to a set of authorized entities, while access to further detailed information may be provided to an authorized subset of the set of entities.

FIG. 6 illustrates an example process 600 for providing secure and/or tiered access to action information, in accordance with some embodiments. In some embodiments, some or all of process 600 may be performed by SMAS 103. In some embodiments, one or more other devices may perform some or all of process 600 in concert with, and/or in lieu of, SMAS 103.

As shown, process 600 may include maintaining (at 602) criteria associated with public and/or private information. For example, as discussed above, SMAS 103 may receive, maintain, update, etc. packaging rules 107, which may indicate criteria such as source of action information (e.g., one or more particular VNFs 101 or other devices or systems), attributes of the source of action information (e.g., one or more types of VNFs 101 or other devices or systems, geographical location of the source of the action data, etc.), content of the action information (e.g., one or more functions, tags, labels, etc. included in the action data), and/or other suitable criteria.

Process 600 may further include receiving (at 604) action information regarding one or more actions performed by one or more systems. For example, SMAS 103 may receive action information via one or more APIs or other suitable communication pathways from the one or more systems. In some embodiments, the one or more systems may include one or more VNFs 101 of a core of a wireless network or other types of devices or systems. In this manner, the operation of VNFs 101 may be monitored, traced, etc. over time, based on which a network operator may perform diagnostics or analytics, effect modifications to the network (e.g., allocating or deallocating resources to particular VNFs 101, instantiating instances of VNFs 101, and/or other configuration modifications), and/or take other suitable measures based on the monitored information. As discussed above, the action information may include labels, tags, etc. provided by the one or more VNFs 101, indicating actions that were taken, attributes of the actions, etc.

Process 600 may additionally include identifying (at 606) subsets of the received action information that meet and/or do not meet the criteria associated with public and/or private information. For example, SMAS 103 may identify a first subset of the received action information that meets criteria associated with private information and/or that does not meet criteria associated with public information. Additionally, or alternatively, SMAS 103 may identify a second subset of the received action information that meets criteria associated with public information and/or that does not meet criteria associated with private information.

Process 600 may also include encrypting (at 608) and/or otherwise securing the subset of the action information that is associated with private information. For example, SMAS 103 may generate and/or otherwise use one or more keys (e.g., a key of an asymmetric key pair) to encrypt the subset of the action information that is associated with private information.

Process 600 may further include generating (at 610) an action package based on the public information and the encrypted private information. For example, SMAS 103 may associate the public information and the encrypted private information with the same identifier, such that an entity that identifies the public information may be able to identify that additional details (e.g., which may be included in the private information) may be sought. In some embodiments, the public information may include portions of the action information (received at 604), and/or may include information regarding a source of the action information (e.g., an identifier of a device or system from which the action information was received, attributes of the device or system from which the action information was received, etc.), and/or may include other suitable information. In this manner, the contents of the public action information may be accessible to entities that do not have access to the encrypted private information (e.g., do not have access to the one or more keys). In some embodiments, SMAS 103 may publish, record, etc. the public and/or encrypted private information, such as to a web portal, a database, a distributed ledger (e.g., a blockchain), or other suitable device or system. In this manner, entities may be able to monitor actions performed by the one or more devices or systems, without necessarily having access to detailed private information regarding such actions.

Process 600 may additionally include providing (at 612) the one or more keys to one or more entities that are authorized to access the private information. For example, SMAS 103 and/or some other device or system (e.g., authentication system 203) may maintain information indicating particular users, UEs 201, and/or other entities that have access to particular private information (e.g., private information associated with particular VNFs 101 and/or private information meeting some other suitable criteria). Once such entity is authenticated and/or determined to be authorized to access the private information, SMAS 103 may provide the one or more keys to such entity, which may use the one or more keys to access (e.g., decrypt) the private information. As discussed above, the private information may further include private information encrypted with a second set of keys, which such entity may obtain from SMAS 103 in a manner described above. In this sense, multiple privacy tiers may be provided, in accordance with some embodiments.

Figure 7:
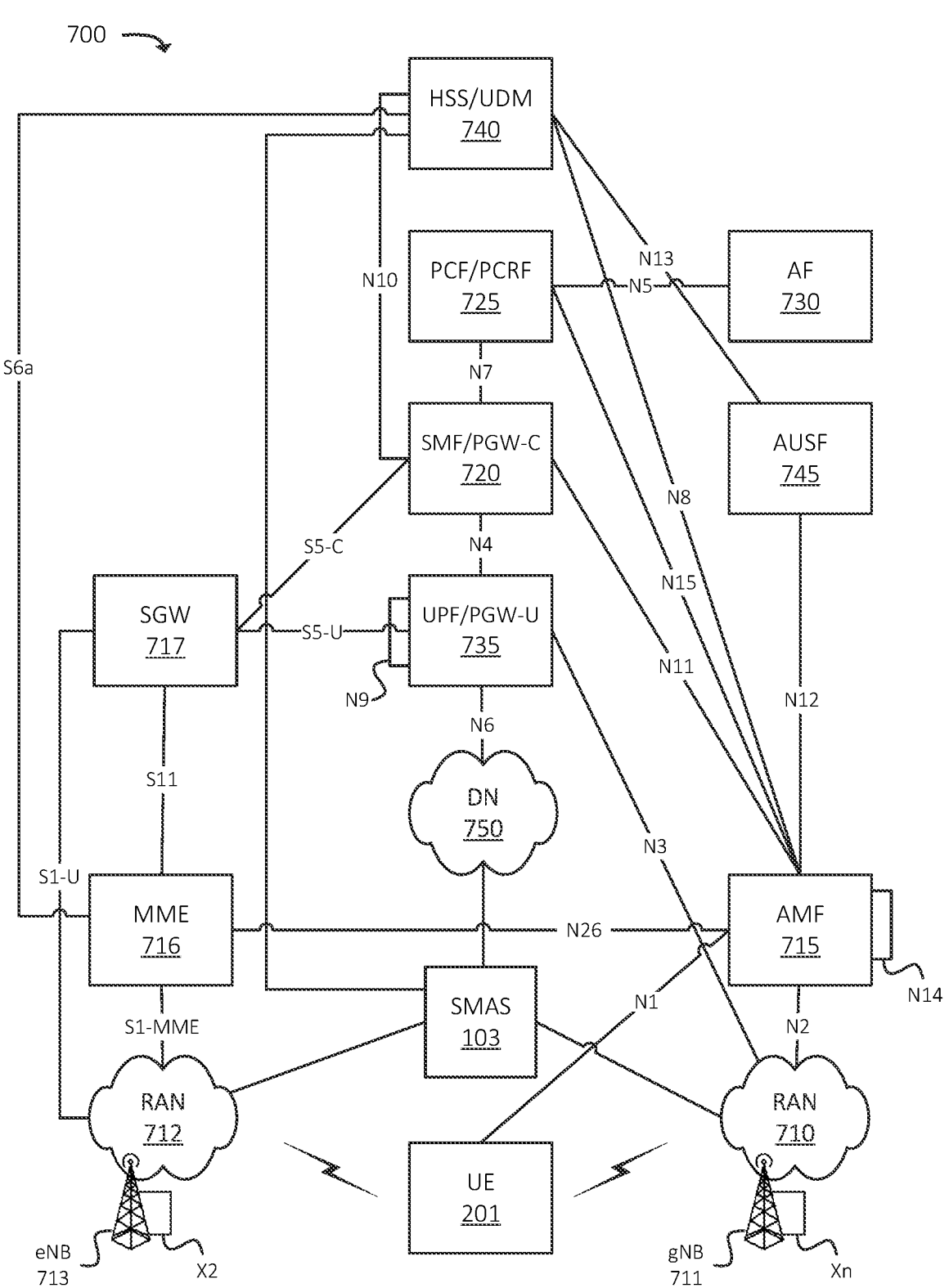
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 800 may represent or may include a 5G core ("5GC"). As shown, environment 700 may include UE 201, RAN 710 (which may include one or more Next Generation Node Bs ("gNBs") 711), RAN 712 (which may include one or more evolved Node Bs ("eNBs") 713), and various network functions such as AMF 715, MME 716, SGW 717, SMF/ PGW-Control plane function ("PGW-C") 720, Policy Control Function ("PCF")/Policy Charging and Rules Function ("PCRF") 725, Application Function ("AF") 730, UPF/ PGW-User plane function ("PGW-U") 735, Unified Data Management ("UDM")/Home Subscriber Server ("HSS") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as SMAS 103. Further, in some embodiments, some or all of the elements of environment 700 may include, may be implemented by, may be communicatively coupled to, etc. one or more VNFs 101.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF/PGW-C 720, PCF/PCRF 725, UPF/PGW-U 735, UDM/HSS 740, and/or AUSF 745, while another slice may include a second instance of SMF/PGW-C 720, PCF/PCRF 725, UPF/PGW-U 735, UDM/HSS 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 201 may include a computation and communication device, such as a wireless mobile communication device that is capable of communicating with RAN 710, RAN 712, and/or DN 750. UE 201 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 201 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 201 may communicate with one or more other elements of environment 700. UE 201 may communicate with RAN 710 via an air interface (e.g., as provided by gNB 711). For instance, RAN 710 may receive traffic (e.g., voice call traffic, data traffic, messaging traffic, signaling traffic, etc.) from UE 201 via the air interface, and may communicate the traffic to UPF/PGW-U 735, and/or one or more other devices or networks. Similarly, RAN 710 may receive traffic intended for UE 201 (e.g., from UPF/PGW-U 735, AMF 715, and/or one or more other devices or networks) and may communicate the traffic to UE 201 via the air interface.

RAN 712 may be, or may include, a LTE RAN that includes one or more base stations (e.g., one or more eNBs 713), via which UE 201 may communicate with one or more other elements of environment 700. UE 201 may communicate with RAN 712 via an air interface (e.g., as provided by eNB 713). For instance, RAN 710 may receive traffic (e.g., voice call traffic, data traffic, messaging traffic, signaling traffic, etc.) from UE 201 via the air interface, and may communicate the traffic to UPF/PGW-U 735, and/or one or more other devices or networks. Similarly, RAN 710 may receive traffic intended for UE 201 (e.g., from UPF/PGW-U 735, SGW 717, and/or one or more other devices or networks) and may communicate the traffic to UE 201 via the air interface.

AMF 715 may include one or more devices, systems, Virtualized Network Functions VNFs, Cloud-Native Network Functions ("CNFs"), etc., that perform operations to register UE 201 with the 5G network, to establish bearer channels associated with a session with UE 201, to hand off UE 201 from the 5G network to another network, to hand off UE 201 from the other network to the network, manage mobility of UE 201 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 201 with the EPC, to establish bearer channels associated with a session with UE 201, to hand off UE 201 from the EPC to another network, to hand off UE 201 from another network to the EPC, manage mobility of UE 201 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 201. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 201, from DN 750, and may forward the user plane data toward UE 201 (e.g., via RAN 710, SMF/PGW-C 720, and/or one or more other devices). In some embodiments, multiple UPFs 735 may be deployed (e.g., in different geographical locations), and the delivery of content to UE 201 may be coordinated via the N9 interface (e.g., as denoted in FIG. 7 by the line marked "N9" originating and terminating at UPF/PGW-U 735). Similarly, UPF/PGW-U 735 may receive traffic from UE 201 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. AUSF 745 and/or UDM/HSS 740 may perform authentication, authorization, and/or accounting operations associated with the subscriber and/or a communication session with UE 201.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 201 may communicate, through DN 750, with data servers, other UEs 201, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 201 may communicate.

Figure 8:
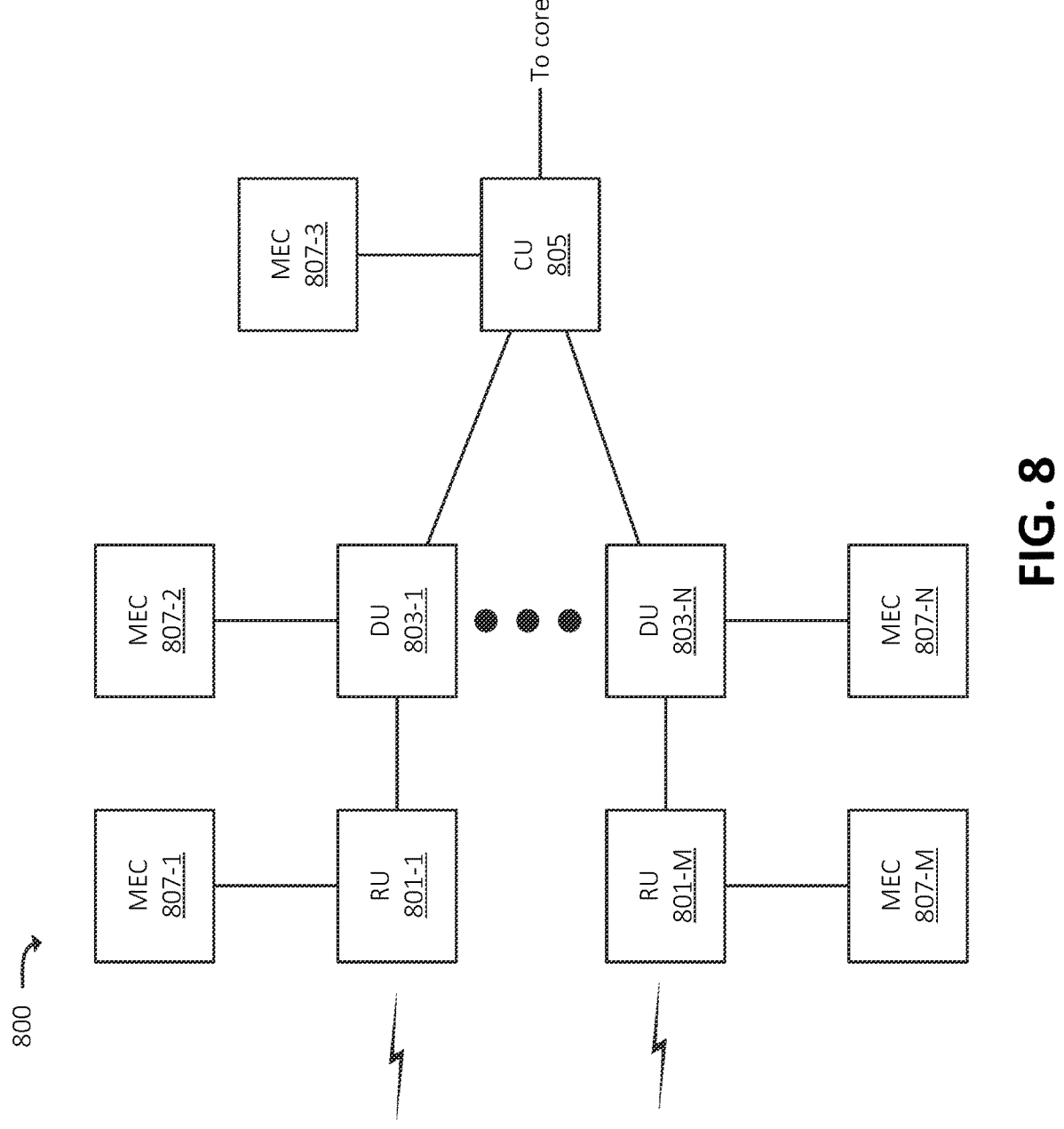
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 201 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 201, and may determine which DU(s) 803 should receive the downlink traffic. DU 803 may include one or more devices that transmit traffic between a core network (e.g., via CU 805) and UE 201 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 201.

RU 801 may include hardware circuitry (e.g., one or more RF transceivers, antennas, radios, and/or other suitable hardware) to communicate wirelessly (e.g., via an RF interface) with one or more UEs 201, one or more other DUs 803 (e.g., via RUs 801 associated with DUs 803), and/or any other suitable type of device. In the uplink direction, RU 801 may receive traffic from UE 201 and/or another DU 803 via the RF interface and may provide the traffic to DU 803. In the downlink direction, RU 801 may receive traffic from DU 803, and may provide the traffic to UE 201 and/or another DU 803.

RUs 801 may, in some embodiments, be communicatively coupled to one or more Multi-Access/Mobile Edge Computing ("MEC") devices, referred to sometimes herein simply as "MECs" 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 201, via a respective RU 801.

For example, RU 801-1 may route some traffic, from UE 201, to MEC 807-1 instead of to a core network (e.g., via DU 803 and CU 805). MEC 807-1 may process the traffic, perform one or more computations based on the received traffic, and may provide traffic to UE 201 via RU 801-1. In this manner, ultra-low latency services may be provided to UE 201, as traffic does not need to traverse DU 803, CU 805, and an intervening backhaul network between DU network 800 and the core network. In some embodiments, MEC 807 may include, and/or may implement, some or all of the functionality described above with respect to SMAS 103, UPF 735, and/or one or more other devices, systems, VNFs, CNFs, etc.

Figure 9:
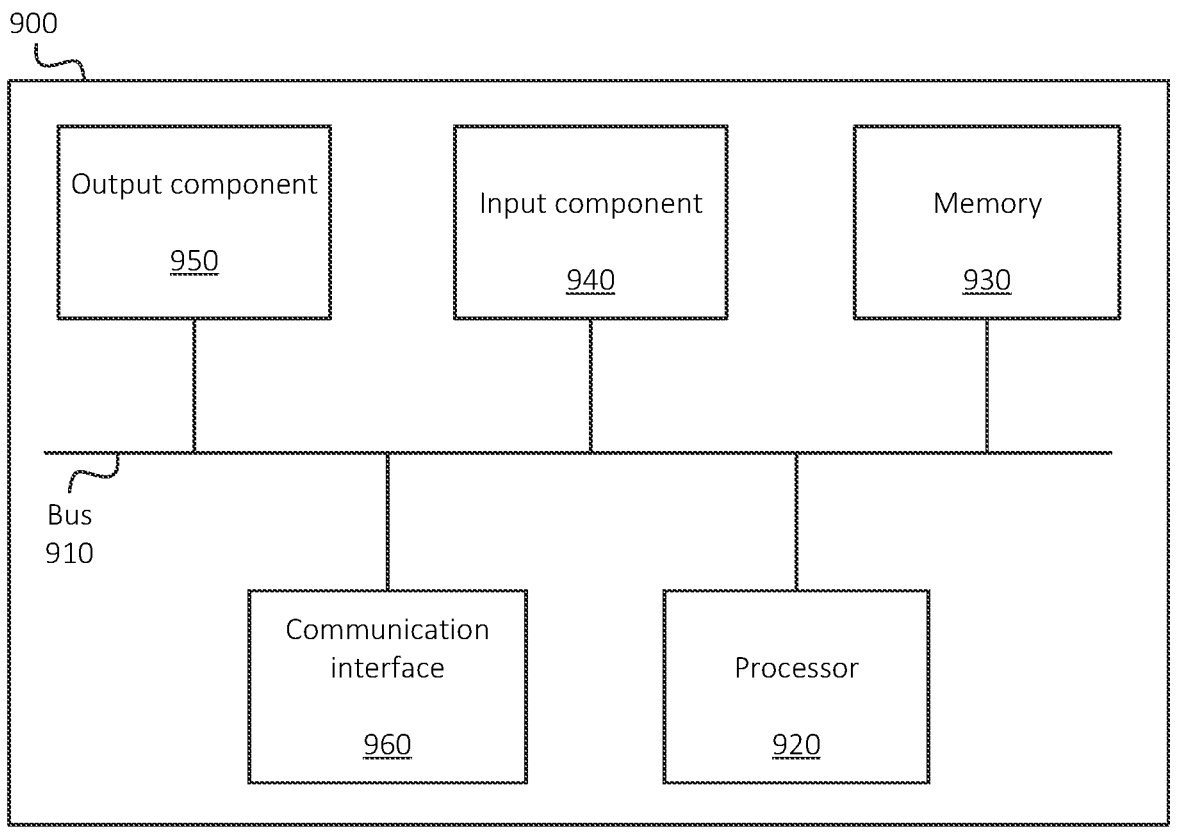
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:

receive or maintain criteria associated with private information, wherein the criteria specifies that the private information includes information regarding a particular type of Virtualized Network Function ("VNF") of a core of a wireless network;

receive action information that includes information regarding one or more actions performed by a plurality of VNFs of the wireless network;

identify a first subset of the action information that is based on actions performed by one or more VNFs of the particular type of VNF;

determine that the first subset of the action information meets the criteria associated with private information based on identifying that the first subset of the action information is based on actions performed by the one or more VNFs of the particular type of VNF;

identify a second subset of the action information that is based on actions performed by one or more VNFs of a different type of VNF;

determine that the second subset of the action information does not meet the criteria associated with private information based on identifying that the second subset of the action information is based on actions performed by the one or more VNFs of the different type of VNF;

encrypt, using one or more keys, the first subset of the action information based on identifying that the first subset meets the criteria associated with private information, wherein the second subset of the action information is unencrypted based on identifying that the second subset of the action information does not meet the criteria associated with private information; and generate an action package based on the encrypted first subset and the unencrypted second subset of the action information, wherein a User Equipment ("UE") uses the one or more keys to decrypt the encrypted first subset of the action information included in the action package.

2. The device of claim 1, wherein the one or more processors are further configured to:

generate an identifier associated with the one or more actions; and associate the identifier with the first subset and the second subset of the action information.

3. The device of claim 1, wherein the one or more processors are further configured to:

publish the encrypted first subset and the second subset of the action information, wherein contents of the first subset are inaccessible without the one or more keys.

4. The device of claim 3, wherein publishing the encrypted first subset and the second subset of the action information includes recording the encrypted first subset and the second subset of the action information to a distributed ledger.

5. The device of claim 1, wherein the first subset of action information is associated with a first tier, wherein the first subset of action information includes a third subset of action information that is associated with a second tier, wherein the one or more keys are a first set of keys, wherein the one or more processors are further configured to:

encrypt the third subset of action information using a second set of keys.

6. The device of claim 5, wherein access to the third subset of action information is provided via the first and second sets of keys.

7. The device of claim 1, wherein the criteria further specifies a particular network slice out of a plurality of network slices associated with the wireless network, wherein determining that the first subset of the action information meets the criteria associated with private information further includes determining that the one or more VNFs of the particular type of VNF are further associated with the particular network slice.

8. A device, comprising:

one or more processors configured to:

receive or maintain criteria associated with public information, wherein the criteria specifies that the public information includes information regarding a first type of Virtualized Network Function ("VNF") of a core of a wireless network;

receive action information that includes information regarding one or more actions performed by a plurality of VNFs of the wireless network;

identify a first subset of the action information that is based on actions performed by a second type of VNF;

determine that the first subset of the action information does not meet the criteria associated with public information based on identifying that the first subset of the action information is based on actions performed by the one or more VNFs of the second type of VNF;

identify a second subset of the action information that is based on actions performed by one or more VNFs of the first type of VNF;

determine that the second subset of the action information meets the criteria associated with public information based on identifying that the second subset of the action information is based on actions performed by the one or more VNFs of the first type of VNF;

encrypt, using one or more keys, the first subset of the action information based on identifying that the first subset does not meet the criteria associated with public information, wherein the second subset of the action information is unencrypted based on identifying that the second subset of the action information meets the criteria associated with public information; and generate an action package based on the encrypted first subset and the unencrypted second subset of the action information, wherein a User Equipment ("UE") uses the one or more keys to decrypt the encrypted first subset of the action information included in the action package.

9. The device of claim 8, wherein the one or more processors are further configured to:

generate an identifier associated with the one or more actions; and associate the identifier with the first subset and the second subset of the action information.

10. The device of claim 8, wherein the one or more processors are further configured to:

publish the encrypted first subset and the second subset of the action information, wherein contents of the first subset are inaccessible without the one or more keys.

11. The device of claim 10, wherein publishing the encrypted first subset and the second subset of the action information includes recording the encrypted first subset and the second subset of the action information to a distributed ledger.

12. The device of claim 8, wherein the first subset of action information is associated with a first tier, wherein the first subset of action information includes a third subset of action information that is associated with a second tier, wherein the one or more keys are a first set of keys, wherein the one or more processors are further configured to:

encrypt the third subset of action information using a second set of keys.

13. The device of claim 12, wherein access to the third subset of action information is provided via the first and second sets of keys.

14. The device of claim 8, wherein the criteria further specifies a particular network slice out of a plurality of network slices associated with the wireless network, wherein determining that the first subset of the action information does not meet the criteria associated with public information further includes determining that the one or more VNFs of the particular type of VNF are further associated with a different network slice than the particular network slice.

15. A method, comprising:

receiving or maintaining criteria associated with private information, wherein the criteria specifies that the private information includes information regarding a particular type of Virtualized Network Function ("VNF") of a core of a wireless network;

receiving action information that includes information regarding one or more actions performed by a plurality of VNFs of the wireless network;

identifying a first subset of the action information that is based on actions performed by one or more VNFs of the particular type of VNF;

determining that the first subset of the action information meets the criteria associated with private information based on identifying that the first subset of the action information is based on actions performed by the one or more VNFs of the particular type of VNF;

identifying a second subset of the action information that is based on actions performed by one or more VNFs of a different type of VNF;

determining that the second subset of the action information does not meet the criteria associated with private information based on identifying that the second subset of the action information is based on actions performed by the one or more VNFs of the different type of VNF;

encrypting, using one or more keys, the first subset of the action information based on identifying that the first subset meets the criteria associated with private information, wherein the second subset of the action information is unencrypted based on identifying that the second subset of the action information does not meet the criteria associated with private information; and generating an action package based on the encrypted first subset and the unencrypted second subset of the action information, wherein a User Equipment ("UE") uses the one or more keys to decrypt the encrypted first subset of the action information included in the action package.

16. The method of claim 15, further comprising:

generating an identifier associated with the one or more actions; and associating the identifier with the first subset and the second subset of the action information.

17. The method of claim 15, further comprising:

publishing the encrypted first subset and the second subset of the action information, wherein contents of the first subset are inaccessible without the one or more keys, wherein publishing the encrypted first subset and the second subset of the action information includes recording the encrypted first subset and the second subset of the action information to a distributed ledger.

18. The method of claim 15, wherein the first subset of action information is associated with a first tier, wherein the first subset of action information includes a third subset of action information that is associated with a second tier, wherein the one or more keys are a first set of keys, the method further comprising:

encrypting the third subset of action information using a second set of keys.

19. The method of claim 18, wherein access to the third subset of action information is provided via the first and second sets of keys.

20. The method of claim 15, wherein the criteria further specifies a particular network slice out of a plurality of network slices associated with the wireless network, wherein determining that the first subset of the action information meets the criteria associated with private information further includes determining that the one or more VNFs of the particular type of VNF are further associated with the particular network slice.

* * * * *